Inventor:
WILLIAM M. BLAGDEN.
By: ATTORNEYS.

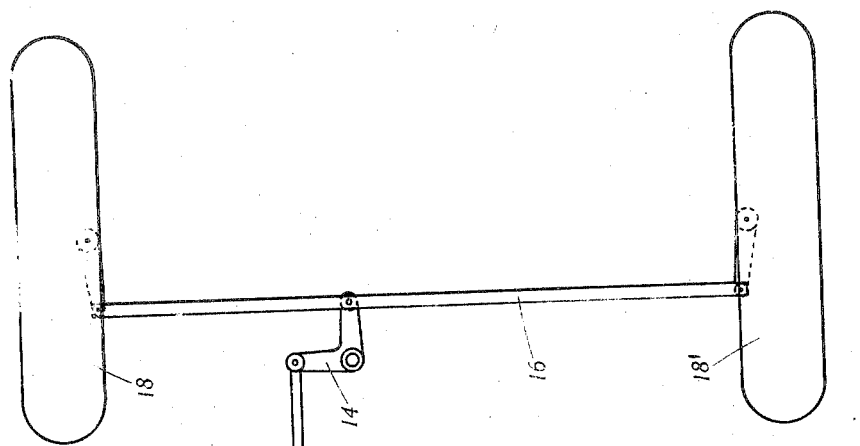
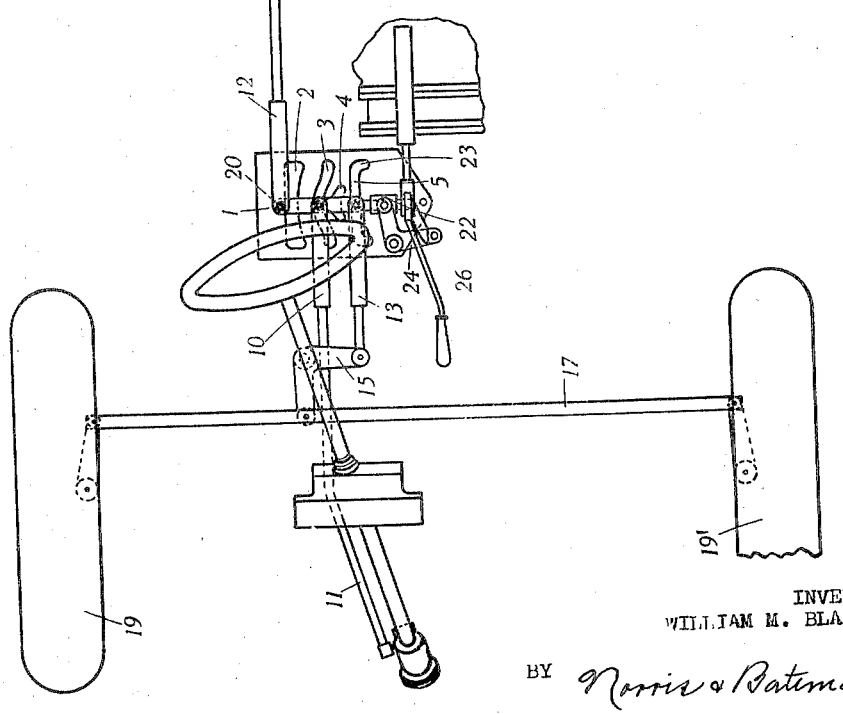
Fig. 2.
INVENTOR
WILLIAM M. BLAGDEN
BY Norris & Bateman
ATTORNEYS March 11, 1941.  W. M. BLAGDEN  2,234,888
STEERING MECHANISM FOR MOTOR VEHICLES
Filed Jan. 12, 1940  5 Sheets-Sheet 3

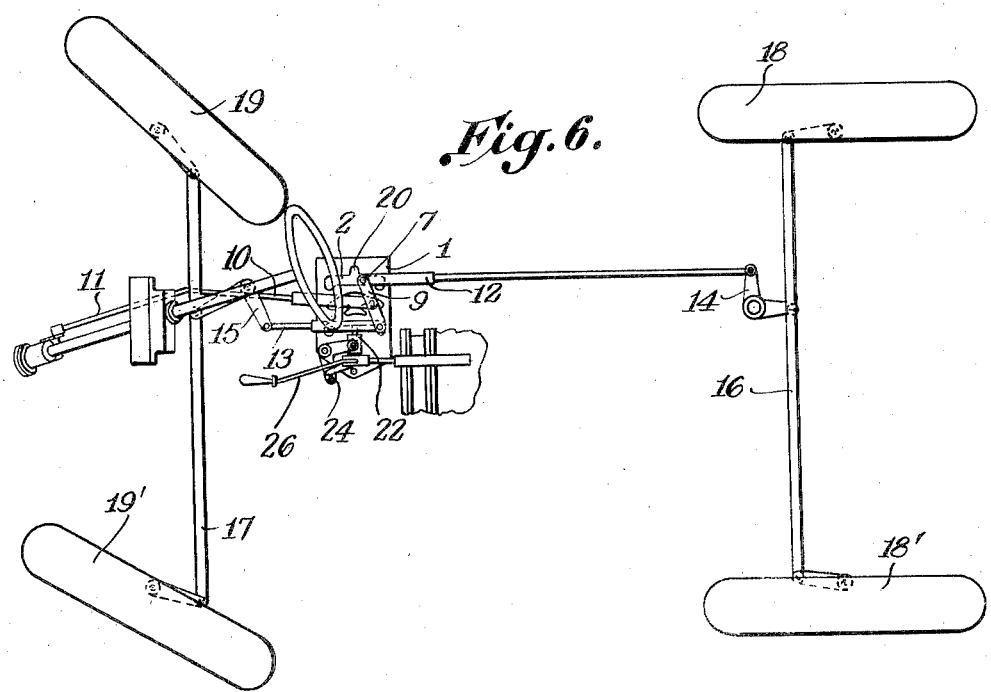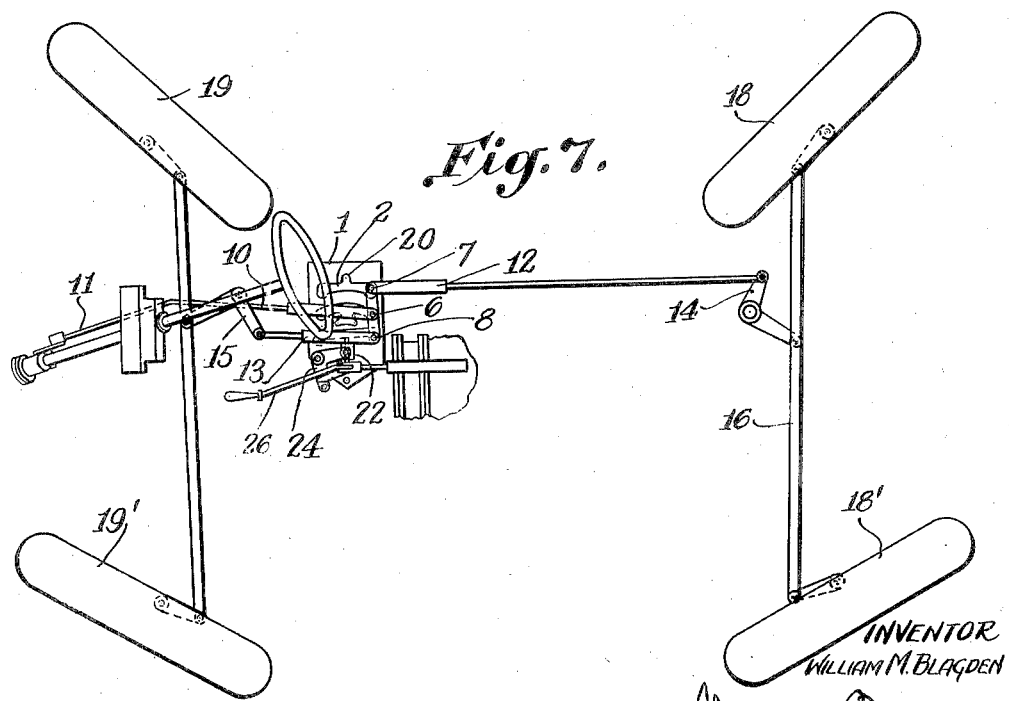

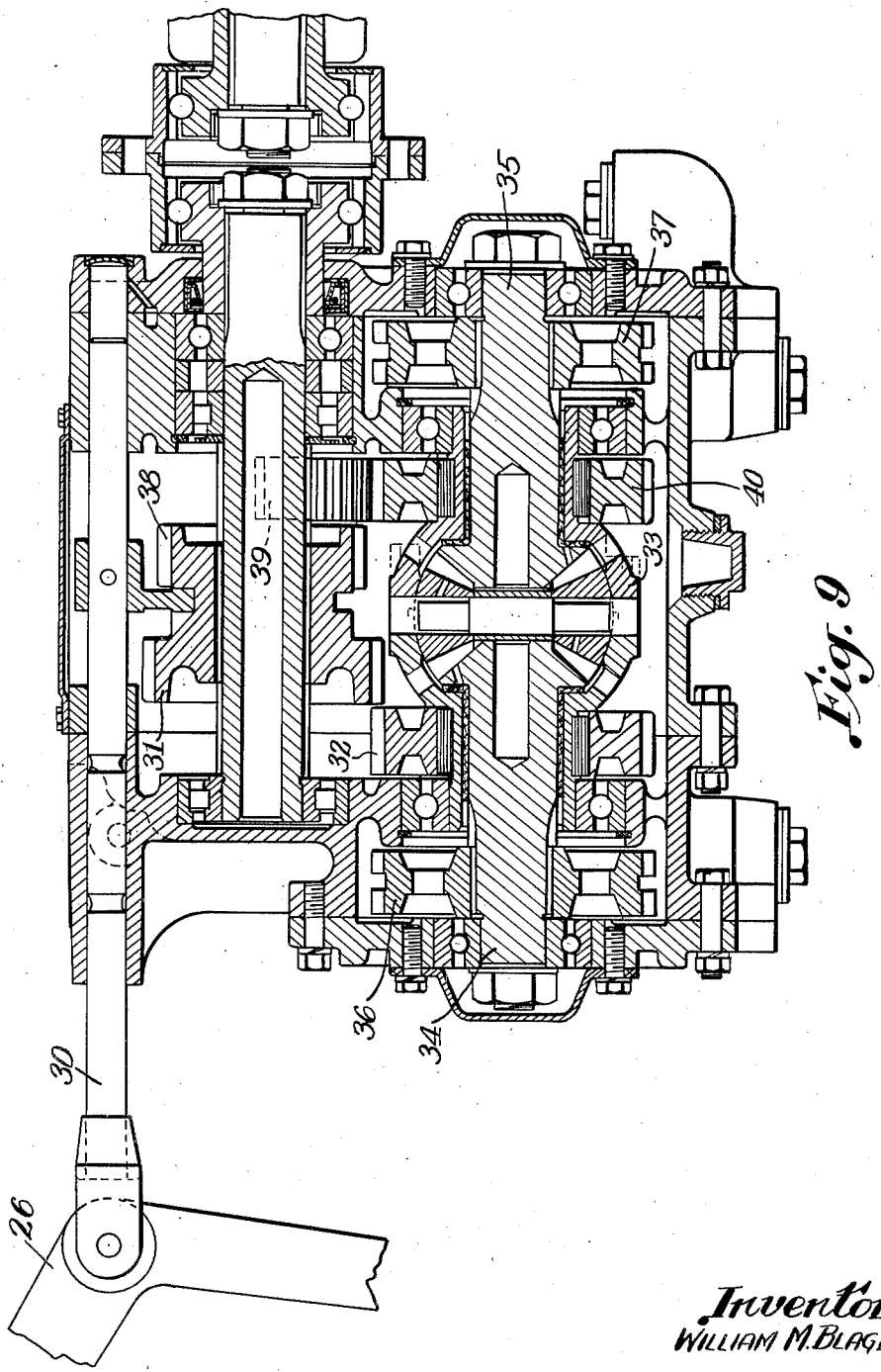

UNITED STATES PATENT OFFICE 2,234,888

STEERING MECHANISM FOR MOTOR VEHICLES

William Martin Blagden, Farnborough, England

Application January 12, 1940, Serial No. 313,484
In Great Britain October 17, 1938

16 Claims. (Cl. 280—91)

This invention relates to motor vehicles and has for its main object to provide means for facilitating the steering of such vehicles when travelling in either direction.

According to the invention a steering mechanism is provided for motor vehicles in which means are provided whereby when the vehicle is moving in a forward direction, the operation of the steering wheel or like device brings about a progressive steering movement of the front and rear wheels.

According to the preferred arrangement, means are provided whereby movement of the steering wheel or like device automatically becomes effective to operate the steering movement of the rear wheels upon the front wheels approaching or reaching the position of full or maximum lock.

The invention also provides means for causing the front wheels to be locked, and for causing the rear wheels to be placed under the control of the steering wheel or like devices. This operation may be effected by a suitable hand lever or by the actuating mechanism of the reverse gearing.

According to the preferred arrangement a common steering device is provided for both front and rear wheels and co-operation between the steering device and the wheels is effected by means of a rocking lever provided with pivot pins adapted to co-operate with a set of slots or guides in a fixed guide plate, said slots or guides being so shaped and arranged as to permit said rocking lever to rock about one of said pivot pins to effect steering of the front wheels and to rock about another of said pivot pins to effect steering of the rear wheels.

The aforesaid slots or guides are preferably provided with means whereby the rocking of the lever to effect steering of the rear wheels is prevented until a predetermined rocking movement to effect steering of the front wheels has occurred, such means preferably comprising suitably disposed recesses or the like in one of said slots or guides adapted to receive the pivot pins about which the lever is adapted to rock when steering of the rear wheels is effected.

The aforesaid rocking lever may be conveniently provided with three of the aforesaid pivot pins, each of which is mounted in a separate slot or guide in the guide plate, the centre pivot pin being connected to means actuated by the steering device and the two outer pins being connected to the track rods of the front and rear wheels respectively. In some cases, however, it may be convenient to connect the two outer pins to the steering arms.

These and other features of the invention will be more completely understood from the following detailed description which is given in conjunction with the accompanying drawings, in which—

Figures 1 and 2 are side and plan views respectively of a four wheeled vehicle embodying a steering mechanism constructed in accordance with the invention, the vehicle itself being in skeleton form, only those parts having been shown which are essential for illustrating the method of connecting up the steering mechanism itself.

Figures 3 and 4 are enlarged plan and sectional views respectively of the master guide plate and connections which form the essential part of the steering mechanism constructed in accordance with the invention, the parts being shown in Figure 3 in position for steering by the front wheels only.

Figures 6, 7 and 8 are diagrammatic views, Figure 6 showing the front steering wheels at maximum right hand lock, Figure 7 showing the rear wheels at full lock following their progressive steering after the maximum lock has been reached by the front wheels, and Figure 8 showing the front wheels locked in straight position and the rear wheels at full lock for rearward driving.

Figure 9 is a vertical longitudinal section of the reverse gearing.

Figure 1:
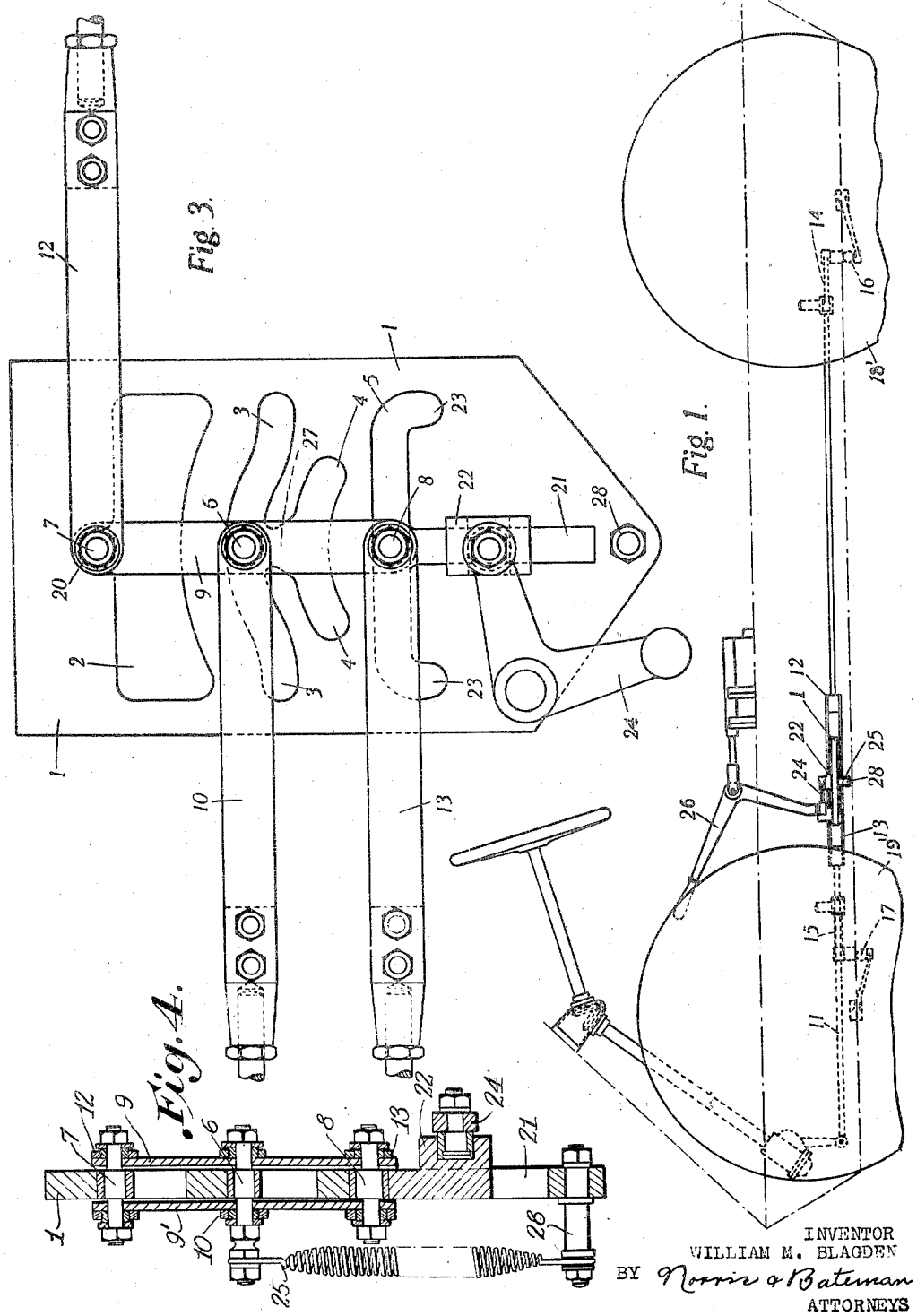

Referring now to these drawings I provide a master or guide plate 1 which is adapted to be fixed by any convenient means between the longitudinal side members of the frame of the vehicle, the said guide plate having formed therein four longitudinally disposed guide grooves 2, 3, 4, 5, the two inner grooves 3, 4 being arranged to co-operate with a central pivot pin 6, and the two outer grooves 2 and 5 being arranged to co-operate with two outer pivot pins 7 and 8, all three pins being mounted on a rocking lever 9 which is movably mounted on said guide plate 1 and pivotally connected by the central pivot pin 6 to an arm or link 10 which connects with the operating arm 11 of the steering box, the outer pivots 7 and 8 of said rocking lever 9 being connected by the arms 12 and 13, and levers 14, 15 respectively with the track rods 16 and 17 of the rear and front steering wheels 18, 18', and 19, 19', the aforesaid guide grooves being so shaped and disposed in the manner as hereinafter described to permit of movement being imparted to the rocking lever 9 to effect the steering of the front wheels, or a combined movement of the front and the back wheels when the vehicle is moving in a forward direction, and also provide for the locking of the front wheels and the steering of the rear wheels when the reverse gear is put into operation and it is desired to move the vehicle in a rearward direction.

The rocking lever, as may be seen from Figure 4, comprises two bars 9, 9' mounted on each side of the guide plate 1 and connected together by the central pivot or hinge pin 6 and the two outer pivot pins 7, 8 which are arranged to engage with their respective guide grooves in the master plate 1, and as previously described the central pivot or hinge pin 6 of the rocking lever 9 is connected to the operating arm of the steering box on the steering column, and one end of the rocking lever is connected to the front steering wheels, while the other end of said rocking lever is connected to the rear steering wheels.

In the centre of the outer guide grooves 2 and 5 in the master plate 1 which receive the outer pivot pins 7, 8 of the rocking lever are formed outwardly disposed recesses 20, 21 so arranged and disposed that by imparting a lateral or sideway movement to the rocking lever 9 one of the outer pivot pins thereon e. g. 7 is brought into engagement with its central pivot recess 20, while the other outer pivot pin 8 is brought into its longitudinal guide groove 5, thus permitting of a rocking movement being imparted to the rocking lever 9 to effect the steering of the vehicle.

For the steering of the vehicle when moving in a forward direction, the rocking lever 9 is normally moved to and held in the required position by a slidable block 22 against the action of a helical spring 25 connected between the central pivot pin 6, and a fixed pin 29. Upon movement being imparted to the rocking lever 9 about its fixed pivot 7 the central pivot or hinge pin 6 is caused to move through the curved guide groove 3 while its other outer pivot pin 8 which carries the arm 13 is moved through its longitudinal guide groove 5 and the aforesaid movement is adapted to provide for the front steering wheels being moved say about two thirds of a complete lock. The outer ends of the aforesaid longitudinal guide groove 5 are curved and arranged to form a pivot recess 23 at each end, each such recess being so disposed and arranged that in the latter part of the movement of the rocking lever 9 the pivot pin 8 on its outer moving end engages with the aforesaid curved end of its guide groove. The curved guide groove guides the central pivot pin so as to cause the said lever to move outward against its spring and to bring the said moving pivot pin 8 into the aforesaid pivot recess 23 at the end of the guide groove 5 and at the same time the pivot pin 7 of the other end of the rocking lever 9 has been withdrawn from its central pivot recess 20 in its longitudinal guide groove or clearance gap 2, as shown in Figure 6, which then permits the rocking lever to pivot about the pin 8 and effect a turning or steering of the rear wheels, the pin 7 being now free to move along the guide groove 2, and impart the necessary movement to the arm 12 connected to the rear wheels to effect steering thereof as shown in Figure 7.

Figure 8:
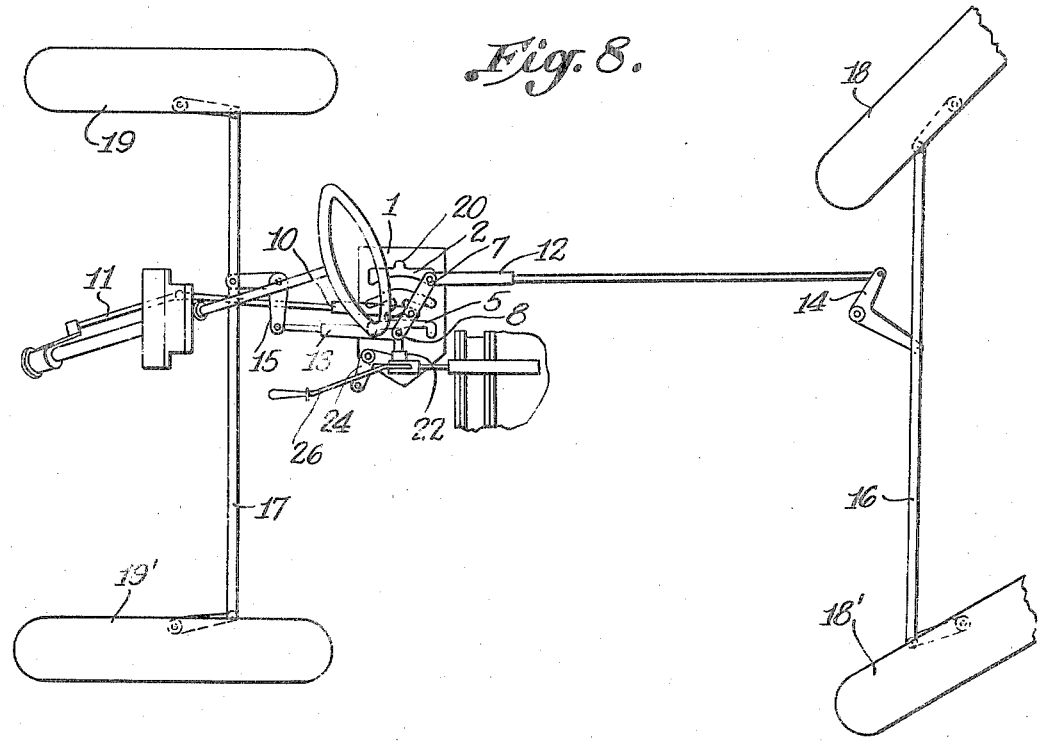

When it is desired to lock the front steering wheels in their straight position, and to effect the steering of the rear wheels only, as for rearward driving, the sliding block 22 is withdrawn from the top of the recess 21 by means of a bell crank lever 24 which is connected with the lever 26 arranged to put into operation the reverse gear, thus allowing the pivot pin 8 of the rocking lever 9 to slide down into the recess 21 under the action of the helical spring 25. Upon this sliding movement being imparted to the rocking lever 9, its central pivot or hinge pin 6 is moved through a central gate or gap 27 into engagement with a segmental guide groove 4 in the master plate 1 while the pivot pin 8 is moved into the recess 21 in the master plate 1, while the other pivot pin 7 is brought into its clearance gap 2 in said plate, thus permitting the said rocking lever 9 to pivot about the pin 8, and effect steering of the rear wheels when the vehicle is being driven in a backward direction, as shown in Figure 8.

When the mechanism is set for steering the vehicle in its forward movement, the pivot recess 21 in the longitudinal guide groove 5 in the master plate 1 may be arranged to be closed by the slidable member or block 22 operatively connected by the bell crank lever 24 with the quick reverse lever, the said slidable block 22 being arranged, when moved up to the mouth of the recess 21, as shown in Figure 3, to form an uninterrupted longitudinal guide groove in which said pivot pin 8 can freely move, and any undesired movement of the rocking lever 9 under the action of its spring 25 is thereby prevented.

Figure 5:
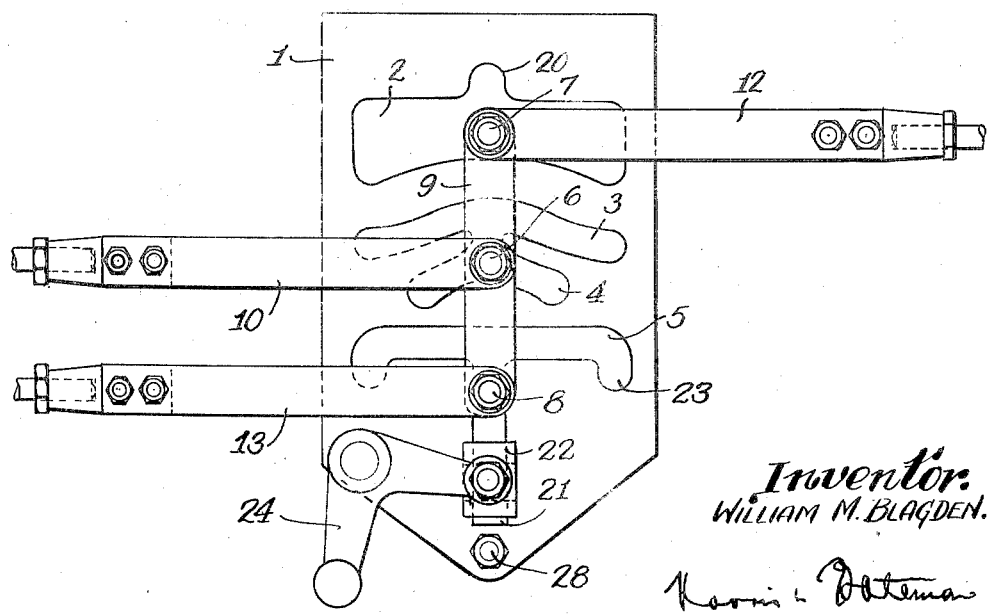
Figure 5 is a view similar to Figure 3, but showing the parts in position for steering by the rear wheels only.

Upon moving the aforesaid lever to put into operation the reverse gear, the aforesaid sliding block 22 is withdrawn, as shown in Figure 5, thus opening the recess 21 in the master plate to receive the pivot pin 8 on the rocking lever 9 immediately the front steering wheels assume a straight position. The rocking lever is then automatically moved under the action of its spring 25, which brings the said pivot pin 8 into its central pivot recess 21 in the master plate, and simultaneously brings the central pivot or hinge pin 6 of the rocking lever 9 through the central gap 27 and into the segmental guide groove 4 in the master plate, as shown in Figure 8, thereby locking the front steering wheels and making operative the steering of the rear wheels of the vehicle.

The reverse gear to which the reverse lever 26 is connected may be of the type shown and described in Patent No. 2,219,249 granted Oct. 22, 1940. It may be described briefly as comprising a rod 30 pivotally connected to the lever 26 to be pulled forwardly or pushed rearwardly when said lever is swung in the corresponding directions. The rod 30, when pulled forwardly, operates to slide a driving pinion 31 into mesh with a gear 32 fixed on a differential housing 33 which serves to drive the vehicle forwardly through shafts 34 and 35 and gears 36 and 37 and, when pushed rearwardly, slides a driving pinion 38 into mesh with an idler gear 39 meshing with a gear 40 fixed on the differential housing and which serves to drive the vehicle rearwardly through the shafts 34 and 35 and gears 36 and 37. The means for connecting the driving gears 36 and 37 to the vehicle wheels may be of any suitable or well known construction so that illustration thereof for the purposes of the present invention is deemed unnecessary.

Having thus described my invention, what I claim as new and desire to secure by Letters Patent is:

1. Steering mechanism for a motor vehicle having front and rear wheels for steering it, comprising a rocking lever having means connecting it to the front and rear wheels for steering them, a guide plate cooperative with said rocking lever, said guide plate having means thereon to cooperate with said lever to effect steering of the front or the rear wheels and to lock the wheels which are not being steered, and means for setting said rocking lever for cooperation with said guide plate to effect automatically steering of the front and rear wheels successively.

2. Steering mechanism according to claim 1, including a reverse driving gear for the vehicle having a controlling lever the operative movement of which controls said setting means for said rocking lever.

3. Steering mechanism according to claim 1, including a reverse driving gear for the vehicle and actuating mechanism therefor, and means controlled by the actuating mechanism of the reverse driving gear for locking the front wheels and placing the rear wheels under control of said controlling member.

4. Steering mechanism for a motor vehicle having front and rear wheels for steering it, and a controlling member, comprising steering connections between said controlling member and the wheels including a rocking lever provided with pivot pins, and a guide plate having a set of guides to cooperate with said pivot pins, said guides being shaped and arranged to permit said rocking lever to rock about one of said pivot pins to effect steering movement of the front wheels and to rock about another of said pivot pins to effect steering movement of the rear wheels.

5. Steering mechanism for a motor vehicle having front and rear wheels for steering it, and a controlling member, comprising steering connections between said controlling member and the wheels including a rocking lever provided with pivot pins, and a guide plate having a set of guides to cooperate with said pivot pins, said guides being shaped and arranged to permit said rocking lever to rock about one of said pivot pins to effect steering movement of the front wheels and to rock about another of said pivot pins to effect steering movement of the rear wheels, said guides being provided with means for preventing the rocking of said lever to effect steering movement of the rear wheels until a predetermined rocking movement to effect steering movement of the front wheels has occurred.

6. Steering mechanism for a motor vehicle having front and rear wheels for steering it, and a controlling member, comprising steering connections between said controlling member and the wheels including a rocking lever provided with pivot pins, and a guide plate having a set of guides to cooperate with said pivot pins, said guides being shaped and arranged to permit said rocking lever to rock about one of said pivot pins to effect steering movement of the front wheels and to rock about another of said pivot pins to effect steering movement of the rear wheels, one of said guides having recesses therein adapted to receive the pivot pin about which said lever is adapted to rock when steering movement of the rear wheels is effected.

7. Steering mechanism for a motor vehicle having front and rear wheels for steering it, and a steering device, a rocking lever provided with a central and two outer pivot pins, a guide plate having a set of guides with which said pivot pins are respectively adapted to cooperate, means connecting the central pivot pin to said steering device for actuation thereby, and means connecting the outer pivot pins to the track rods of the front and rear wheels respectively, said guides being shaped and arranged for rocking movement of said rocking lever about one of said outer pivot pins to effect steering movement of the front wheels and for rocking movement about the other of said outer pivot pins to effect steering movement of the rear wheels.

8. Steering mechanism for a motor vehicle having front and rear wheels for steering it, and a steering device, a rocking lever provided with a central and two outer pivot pins, a guide plate having a set of guides with which said pivot pins are respectively adapted to cooperate, means connecting the central pivot pin to said steering device for actuation thereby, and means connecting the outer pivot pins to the track rods of the front and rear wheels respectively, said guides being shaped and arranged for rocking movement of said rocking lever about one of said outer pivot pins to effect steering movement of the front wheels and for rocking movement about the other of said outer pivot pins to effect steering movement of the rear wheels, the guide cooperating with the pivot pin connected with the rear wheels being provided with a recess for receiving said pivot pin whereby said lever may rock about the said pivot pin and permit steering movement of the front wheels.

9. Steering mechanism for a motor vehicle having front and rear wheels for steering it, and a steering device, a rocking lever provided with a central and two outer pivot pins, a guide plate having a set of guides with which said pivot pins are respectively adapted to cooperate, means connecting the central pivot pin to said steering device for actuation thereby, and means connecting the outer pivot pins to the track rods of the front and rear wheels respectively, said guides being shaped and arranged for rocking movement of said rocking lever about one of said outer pivot pins to effect steering movement of the front wheels and for rocking movement about the other of said outer pivot pins to effect steering movement of the rear wheels, the guide cooperating with the pivot pin connected with the front wheels being provided with a recess at each end for receiving said pivot pin whereby upon said pin reaching one or the other of said recesses, said lever may rock about said pin and cause steering movement of the rear wheels.

10. Steering mechanism for a motor vehicle having front and rear wheels for steering it, and a steering device, a rocking lever provided with a central and two outer pivot pins, a guide plate having a set of guides with which said pivot pins are respectively adapted to cooperate, means connecting the central pivot pin to said steering device for actuation thereby, and means connecting the outer pivot pins to the track rods of the front and rear wheels respectively, said guides being shaped and arranged for rocking movement of said rocking lever about one of said outer pivot pins to effect steering movement of the front wheels and for rocking movement about the other of said outer pivot pins to effect steering movement of the rear wheels, the guide cooperating with the pivot pin connected with the front wheels being provided with a centrally disposed recess adapted to receive said pin when the vehicle is in reverse gear whereby said lever is adapted to rock about said pin and effect steering movement of the rear wheels.

11. Steering mechanism for a motor vehicle having front and rear wheels for steering it, and a steering device, a rocking lever provided with a central and two outer pivot pins, a guide plate having a set of guides with which said pivot pins are respectively adapted to cooperate, means connecting the central pivot pin to said steering device for actuation thereby, and means connecting the outer pivot pins to the track rods of the front and rear wheels respectively, said guides being shaped and arranged for rocking movement of said rocking lever about one of said outer pivot pins to effect steering movement of the front wheels and for rocking movement about the other of said outer pivot pins to effect steering movement of the rear wheels, the guide cooperating with the pivot pin connected with the front wheels being provided with a centrally disposed recess adapted to receive said pin when the vehicle is in reverse gear whereby said lever is adapted to rock about said pin and effect steering movement of the rear wheels, means for holding said pivot pin out of said recess when the vehicle is in neutral or a forward gear, and means operative automatically by movement of the gear lever into reverse to move said pin into said recess.

12. Steering mechanism for a motor vehicle having front and rear wheels for steering it, and a steering device, a rocking lever provided with a central and two outer pivot pins, a guide plate having a set of guides with which said pivot pins are respectively adapted to cooperate, means connecting the central pivot pin to said steering device for actuation thereby, and means connecting the outer pivot pins to the track rods of the front and rear wheels respectively, said guides being shaped and arranged for rocking movement of said rocking lever about one of said outer pivot pins to effect steering movement of the front wheels and for rocking movement about the other of said outer pivot pins to effect steering movement of the rear wheels, the guide cooperating with the pivot pin connected with the front wheels being provided with a centrally disposed recess adapted to receive said pin when the vehicle is in reverse gear whereby said lever is adapted to rock about said pin and effect steering movement of the rear wheels, means for holding said pivot pin out of said recess when the vehicle is in neutral or a forward gear, and means operative automatically by movement of the gear lever into reverse to move said pin into said recess, said guide plate having an additional guide to cooperate with said central pivot pin when the vehicle is in reverse gear, said additional guide being connected by a gap in the guide plate with the slot or guideway which normally cooperates with the central pivot pin.

13. Steering mechanism for motor vehicles having front and rear wheels for steering it, and a steering device, a fixed guide plate, a rocking lever having means including a pair of pivot pins for connecting its opposite ends respectively to the front and rear wheels to cause steering movement thereof in opposite angular directions, and having means including a central pivot for connecting it to said steering device, said guide plate being provided with oppositely disposed central pivot recesses for engagement therewith of one or the other of said pair of pivot pins, and being provided with curved guides and a connecting gate for movement of the central pivot into cooperation with one or the other of said curved guides, and said guide plate having outer guides for movement therein of one of said pair of pivot pins when the other pivot pin of said pair is pivotally engaged with its recess in the guide plate.

14. Steering mechanism according to claim 13 wherein the ends of the guide in which the pivot pin moves during steering of the front wheels are provided with pivot recesses into which said pivot pin is movable as it approaches either end of its guide while the pivot pin connected to the rear wheels is simultaneously withdrawn from its central pivot recess, whereby a movement of the rocking lever will effect a steering movement of the rear wheels in an angular direction opposite to that which is assumed by the front wheels.

15. Steering mechanism according to claim 13 wherein the ends of the guide in which the pivot pin moves during steering of the front wheels are provided with pivot recesses into which said pivot pin is movable as it approaches either end of its guide while the pivot pin connected to the rear wheels is simultaneously withdrawn from its central pivot recess, whereby a movement of the rocking lever will effect a steering movement of the rear wheels in an angular direction opposite to that which is assumed by the front wheels, and means for normally retaining said rocking lever in a position for effecting successive steering movements of the front and rear wheels when the vehicle is moving in a forward direction.

16. Steering mechanism according to claim 13 wherein the ends of the guide in which the pivot pin moves during steering of the front wheels are provided with pivot recesses into which said pivot pin is movable as it approaches either end of its guide while the pivot pin connected to the rear wheels is simultaneously withdrawn from its central pivot recess, whereby a movement of the rocking lever will effect a steering movement of the rear wheels in an angular direction opposite to that which is assumed by the front wheels, means for normally retaining said rocking lever in a position for effecting successive steering movements of the front and rear wheels when the vehicle is moving in a forward direction, and means arranged to cooperate with the reverse lever to cause the rocking lever to move laterally to bring the pivot pin thereon which is connected with the front wheels of the vehicle into engagement with its central pivot recess in the guide plate and thereby hold the front wheels in alignment with the vehicle and cause steering movement of the rear wheels by movement of the rocking lever about said pivot pin.

WILLIAM MARTIN BLAGDEN.